United States Patent [19]

Belusa

[11] Patent Number: 4,705,457
[45] Date of Patent: Nov. 10, 1987

[54] MONITORING OF FLUID FLOW

[75] Inventor: Manfred L. Belusa, Islington, Ontario, Canada

[73] Assignee: Belvin Properties Limited, Toronto, Ontario, Canada

[21] Appl. No.: 908,945

[22] Filed: Sep. 16, 1986

Related U.S. Application Data

[63] Continuation of Ser. No. 571,747, Jan. 18, 1984, abandoned, which is a continuation-in-part of Ser. No. 491,878, May 5, 1983, abandoned.

[51] Int. Cl.$^4$ .............................................. F04B 49/00
[52] U.S. Cl. ........................................ 417/22; 98/33.1; 417/42; 236/49
[58] Field of Search .................. 236/49; 417/22, 24, 417/42, 1; 364/556, 510

[56] References Cited

U.S. PATENT DOCUMENTS

| | | | |
|---|---|---|---|
| 3,653,590 | 4/1972 | Elsea | 236/49 |
| 4,108,574 | 8/1978 | Bartley et al. | 417/19 |
| 4,248,194 | 2/1981 | Drutchas | 417/22 X |

FOREIGN PATENT DOCUMENTS

0056693 5/1982 Japan .

Primary Examiner—William E. Wayner
Attorney, Agent, or Firm—Fetherstonhaugh & Co.

[57] ABSTRACT

A method and apparatus for generating a rate of flow signal which is proportional to the flow rate in a fluid distribution system and which is based on a signal which is proportional to the speed of the fluid circulating device and which makes use of the characteristic curves of a fluid circulating system and fluid delivery device is disclosed. In an air-conditioning system having a variable speed supply fan and a variable speed return fan, a method and apparatus for controlling the capacity of the return fan to closely match that of the supply fan is provided. The method comprises the steps of; monitoring the supply fan speed and discharge pressure and generating a first signal which is a measure of the supply fan capacity at the monitored speed, matching the return fan capacity with the supply fan capacity to achieve any required ratio of return fan output to supply fan output and generating a second signal which is a measure of the desired return fan speed required to provide the return fan output and driving the return fan at the measured speed indicated by the second signal.

6 Claims, 9 Drawing Figures

MONITORING OF FLUID FLOW

This application is a continuation of application Ser. No. 571,747, filed 01/18/84, now abandoned which is a continuation-in-part of application Ser. No. 491,878 filed May 5, 1983 now abandoned.

This invention relates to a method and apparatus for determining the fluid flow in a fluid distribution system.

The method and apparatus of the present invention is particularly suitable for use in determining the rate of flow of air in a variable air flow fan system which has a variable speed fan, such as an air conditioning system.

The method and apparatus of the present invention is also suitable for use in determining the rate of flow of liquid in a variable liquid flow pump system which has a variable speed pump.

PRIOR ART

The need for a simple, inexpensive and direct method of indicating flow in an air circulating system or a liquid circulating system is well known.

In air circulating systems such as air conditioning systems the rate of flow is usually measured by installing a duct traverse consisting of a series of flow tubes with a pitot tube in each flow tube. The signal from each flow tube is averaged, and summed. Since this signal varies as the square of the flow, the square root must be taken. This output may then be used to indicate air flow.

The problem with this approach is that each stage of signal processing introduces errors. Also, the most economical computation systems are pneumatic. Manufacturers of this type of system claim an accuracy of about + or −7% with a newly calibrated system. The reason for this inaccuracy is the problem of obtaining accurate signals from a duct traverse. The accuracy will deteriorate further if the computation circuits drift with age or if the pitot tubes become clogged in use. Substituting electronic computation circuits for pneumatic ones will result in less drift, but the maximum error of about + or −7% may not be appreciably decreased.

SUMMARY OF INVENTION

Using the characteristic curves of a fluid circulating system and fluid delivery device I have developed a simple and accurate method of generating a rate of flow signal which is proportional to the flow rate in a fluid distribution system and which is based on a signal which is proportional to the speed of the fluid circulating device.

In addition I have designed a simple and accurate rate of flow signal generating means for generating a rate of flow signal which is proportional to the flow rate in a fluid distribution system and which is based on a signal which is proportional to the speed of operation of the fluid circulating device.

My method and control system is much simpler than that previously available and has a greater accuracy with essentially no deterioration in accuracy with time.

According to one aspect of the present invention there is provided in a fluid circulating system which includes a conduit for conveying the fluid from a fluid delivery device which provides a variable volume fluid discharge by varying the speed of operation of the fluid delivery device, and wherein it is necessary to generate a rate of flow signal which is proportional to the volume of fluid delivered by the fluid delivery device in use, the improved method of generating said rate of flow signal comprising the steps of;

(i) generating a first signal which is proportional to the speed of the fluid delivery device, (ii) inputting the first signal to a curve fitter which is programmed with the combined fluid delivery device/system speed/flow charcteristic curves of the system and to output an output signal which is proportional to fluid flow delivered by the fluid delivery device.

According to a further aspect of the present invention there is provided in a fluid circulating system which includes a conduit for conveying the fluid from a fluid delivery device which provides a variable volume fluid discharge by varying the speed of operation of the fluid delivery device, and means for generating a first signal which is proportional to the speed of the fluid delivery device, and wherein it is necessary to generate a rate of flow signal which is proportional to the volume of fluid delivered by the fluid delivery device in use, the improvement of means for generating said rate of flow signal comprising;

(i) a curve fitter having an input and an output, said input communicating with said means for generating said first signal, said curve fitter being programmed with the combined fluid delivery device/system speed/flow characteristic curves of the system and being adapted to receive said first signal and to generate a second signal which is proportional to fluid flow delivered by the fluid delivery device, said second signal being discharged at said output.

According to yet another aspect of the present invention there is provided in a an air circulating system which includes a duct for conveying air from a variable speed fan which provides a variable volume air discharge by varying the speed of the fan, and wherein it is necessary to generate a rate of flow signal which is proportional to the amount of air delivered by the air circulating system in use, the improved method of generating said rate of flow signal comprising the steps of;

(i) generating a first signal which is proportional to the speed of the fan, (ii) inputting the first signal to an input of a curve fitter which is programmed with the combined fluid delivery device/system speed/flow characteristic curves of the system and being adapted to receive said first signal and to generate a second signal which is proportional to fluid flow delivered by the fluid delivery device, said second signal being discharged at an output of said curve fitter.

According to one aspect of the present invention there is provided in a fluid circulating system which includes a conduit for conveying the fluid from a fluid delivery device which provides a variable volume fluid discharge by varying the speed of operation of the fluid delivery device and wherein it is necessary to generate a signal which is proportional to the volume of fluid delivered by a variable fluid volume fluid delivery device, the improved method of generating said control signal comprising the steps of;

(i) generating a first signal which is proportional to the speed of the fluid delivery device, (ii) passing the first signal to a first input of a dual input curve fitter which is programmed with the combined fluid delivery device/system speed/flow characteristic curves of the system, (iii) generating a second signal which is proportional to the pressure in the conduit, and (iv) passing the second signal as a second input to the dual input curve fitter to offset the first signal prior to curve fitting and thereafter fitting the offset signal to the curve of the curve fitter to generate an output signal which is proportional to fluid flow delivered by the fluid delivery device.

According to a further aspect of the present invention there is provided in a fluid circulating system which includes a conduit for conveying the fluid from a fluid delivery device which provides a variable volume fluid discharge by varying the speed of operation of the fluid delivery device and wherein it is necessary to generate a signal which is proportional to the volume of fluid delivered by the fluid delivery device, the improvement of means for generating a fluid flow signal comprising;

(i) first signal generating means for generating a first signal which is proportional to the speed of the fluid delivery device, (ii) second signal generating means adapted to generate a second signal which is proportional to the pressure in the conduit, and (iii) dual input curve fitter having first and second inputs, said first input of said dual input curve fitter means communicating with said first signal generating means to receive said first signal, said second input of said dual input curve fitter means communicating with said second signal generating means to receive said second signal, said curve fitter means being programmed with the speed-fluid volume output curves of the selected variable fluid volume fluid delivery device, and being adapted to generate a third signal which is proportional to fluid flow delivered by the fluid delivery device.

According to one aspect of the present invention there is provided in an air conditioning system having a variable speed supply fan for supplying a variable volume of air through a supply duct by varying the speed of operation of the air fan, a method of generating a signal which is indicative of the volume of air supplied to the system through an air supply duct comprising the steps of:

(i) generating a first signal which is proportional to the speed of the air supply fan, . (ii) passing the first signal to a dual input curve fitter which is programmed with the speed-air volume output curves of the selected variable air volume air delivery device, (iii) generating a second signal which is proportional to the pressure in the duct system, and (iv) passing the second signal as a second input to the dual input curve fitter to generate a third signal which is proportional to air flow delivered by the air delivery device.

According to a further aspect of the present invention there is provided in a air conditioning system which includes a duct for conveying the air from a variable speed supply fan which provides a variable volume air discharge by varying its speed of operation and wherein it is necessary to generate a signal which is proportional to the volume of air delivered by the variable speed supply fan, the improvement of means for generating a control signal comprising;

(i) first signal generating means for generating a first signal which is proportional to the speed of the supply fan, (ii) second signal generating means adapted to generate a second signal which is proportional to the pressure in the duct system, and (iii) dual input curve fitter having first and second inputs, said first input of said dual input curve fitter means communicating with said first signal generating means to receive said first signal, said second input of said dual input curve fitter means communicating with said second signal generating means to receive said second signal, said curve fitter means being programmed with the speed-air volume output curves of the selected variable air volume air delivery device, and being adapted to generate a third signal which is proportional to air flow delivered by the air delivery device.

PREFERRED EMBODIMENT

The invention will be more clearly understood with reference to the following detailed specification read in conjunction with the drawings wherein.

The System Curve Equation (Pressure/Flow) which is characteristic of the duct system and which relates the total pressure in a system such as a fan system to the rate of flow of air in the system is well known.

Similarly fan curves (Pressure/Flow/Speed) which relate the speed of the fan to the pressure drop and to the flow rate of the fan have been available to fan users for many years. The fan curves and computer print-outs which provide similar information are provided by fan manufacturers.

I combine the information which is available in the System Curves, which are characteristic of the system, and the information which is available in the air circulating device curves, which are characteristic of the air circulating device, to determine Combined Air Circulating Device/System Characteristics of a Air Circulating System.

I can, for example, combine the information which is available in the System Curve of an air circulating system, which is characteristic of the system, and the information which is available in the Fan Curves, which are characteristic of the fan, to determine Combined Fan/System Characteristics of an air conditioning system or the like.

I can also combine the information which is available in the System Curve of liquid pumping system, which is characteristic of the system, and the information which is available in the Pump Curves, which are characteristic of the pump, to determine Combined Pump/System Characteristics of a liquid pumping system.

As previously indicated it is well known that the conditions under which air flow takes place in an air conditioning duct is subject to the following equation:

$$dP = C_1 q^2 + C_2 q^1 + C_3 q^0 \qquad \text{EQUATION 1}$$

Where
$C_1$, $C_2$, $C_3$ are constants
$q$ = air flow in suitable units
$dP$ = pressure drop of duct system in suitable units.

EQUATION 1 breaks up the pressure drop into components due to totally turbulent flow depicted by the $q^2$ term; due to laminar flow depicted by the $q^1$ term; and a component independent of flow depicted by the $q^0$ term. (Note $q^0 = 1$). Experience indicates that in the range of operation of most air conditioning systems of less than 50% capacity reduction (turndown) and low settings of the discharge pressure controller, the laminar flow component is usually negligible. If we assume this term to be zero, then EQUATION 1 simplifies to the following:

$$dP = C_1 q^2 + C_3 q^0 \qquad \text{EQUATION 2}$$

In air conditioning systems where the laminar flow component is not negligable, it must, of course, be taken into account by solving EQUATION 1.

On the other hand in a system where the pressure is not controlled and laminar flow does not exist in the normal operating range of the fan (i.e. $C_2 = 0$); then Equation 1 may be further simplified as follows;

$$dP = C_1 q^2 + C_2 q^1 + C_3 q^0 \qquad \text{EQUATION 1}$$

$$dP = C_1 q^2 + 0 + 0$$

$$dP = C_1 q^2 \qquad \text{EQUATION 3}$$

CURVE FITTER

Figure 4:
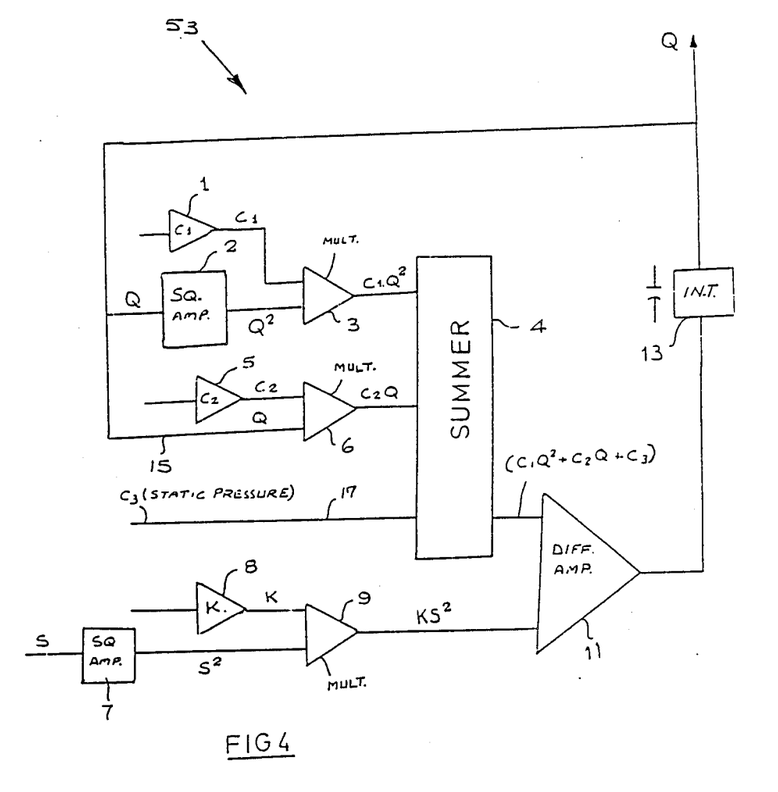
FIG. 4 is a diagram illustrating a curve fitter suitable for use in the controller of FIG. 3.

A suitable curve fitter is illustrated in FIG. 4 of the drawings.

As previously indicated the fan speed and air flow in an air conditioning system may be expressed by the Equation 1 as follows:

$$dP = C_1 q^2 + C_2 q^1 + C_3 q^0$$

Therefore;

$$0 = C_1 q^2 + C_2 q^1 + C_3 q^0 - dP \qquad \text{(EQUATION 4)}$$

The theoretical relationship between the speed of a fan and the pressure rise across a fan and the relationship between the speed of a fan and the air flow of a fan is well known;

i.e. $S_1/S_2 = q_1/q_2$ and $S_{12}^2/S_2 = P_1/P_2$

Where S is the speed of the fan in RPM. Therefore;

$$P_1 = P_2 \times \frac{S_{12}^2}{S_2}$$

and then the speed is at a maximum then $$\frac{P_{22}}{S_2} = K$$

where K is a constant
Therefore; $dP = KS^2$ in EQUATION 4

$$0 = C_1 q^2 + C_2 q^1 + C_3 q^0 - KS^2 \qquad \text{EQUATION 5}$$

The curve fitter 53 (FIG. 3) is designed to be programmed to solve EQUATION 5. With reference to FIG. 4 of the drawings it will be seen that the curve fitter 53 comprises a potentiometer 1 and a squaring amplifier 2 which are connected to a multiplier 3 which is in turn connected to a summer 4. A second potentiometer 5 and the line 15 (Q) are connected to a multiplier 6 which is in turn connected to summer 4. Static pressure line 17 is also connected to the summer 4. A squaring amplifier 7 and a potentiometer 8 are connected to a multiplier 9. The outputs of the summer 4 and multiplier 9 are connected to the inputs of a difference amplifier 11 which is in turn connected to integrator 13.

In use this curve fitter is programmed by dialing in the value of the constants $C_1$, $C_2$ and K to the potentiometers 1, 5 and 8 respectively. The multiplier 3 receives signals $C_1$ and $Q_2$ and multiplies the values to provide an output signal $C_1 Q^2$. The multiplier 6 receives signals Q and $C_2$ and generates an output signal $C_2 Q$ to the summer 4. The signal $C_3$ is fed directly to an input of the summer 4. The summer 4 sums these signals to provide an output signal $(C_1 Q^2 + C_2 Q + C_3)$ which is fed to the difference amplifier 11. Similarly the signal $KS^2$, which is the output from the multiplier 9, is fed to the other input of the difference amplifier 11.

If the two input signals to the difference amplifier 11 are equal, then the output signal from the difference amplifier 11 is zero, then the output of the integrator 13 is constant and this signal can be interpreted as a measure of the rate of flow of air through the air conditioning system. If the two input signals to the difference amplifier 11 are not equal then the output signal from the difference amplifier 11 is non zero. This error signal is integrated by integrator 13 to provide a feedback which will adjust the inputs to the summer 4 until the balance is restored in the difference amplifier 11, which has the effect of adjusting Q to equal the actual rate of flow signal. Thus when the signal Q, which is based on the speed of the fan, is stable, it is proportional to the actual rate of flow of air.

EXAMPLE 1

In a typical air conditioning application, where the pressure is not controlled and laminar flow does not exist the ducting system is designed by an engineering contractor. The engineering contractor also specifies the fan to be used in association with the system. Typically, the designer of a control system may be advised that the fan which is to be used is designed to deliver 61,200 cfm at 5" w.g.

With this information, I can proceed to design a control system which will have a substantially greater accuracy and stability when utilizing a variable speed fan to control the rate of flow of air.

In this example, where the value of "q" (rate of flow) is high and where the pressure is not controlled and laminar flow does not exist, EQUATION 3 may be used to establish the System Curve.

At maximum air flow the system is designed to convey 61,200 CFM of air when overcoming a duct pressure of 5" WG. therefore:
in EQUATION 3, when dP=5", we have;

$$5 = C_1(61,200)^2,$$

therefore:
$C_1 = 5/(61,200)^2$

Therefore Equation 3 provides:

$$dP = \frac{5}{(61,200)^2} \times q^2$$

Thus, air flow in this type of duct system is in accordance with the Equation 3, which can now be solved for flow rates within the stable operating conditions of the system such as 100% to 40% in 10% increments.

For example when 90% flow rate required;

$$dP = \frac{5}{(61,200)^2} \times (.9 \times 61,200)^2$$

$$= 4.05$$

Figure 8:
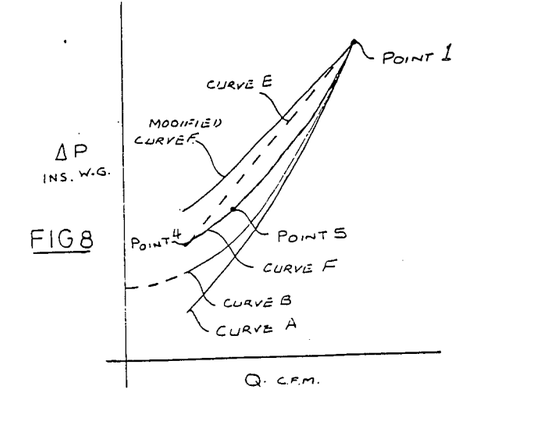
FIG. 8 is a diagram illustrating a typical system curve of an air conditioning instalation.

With this information the System Curve A of FIG. 8, (Pressure/Flow) may be plotted or a System Table (Pressure/Flow) may be tabulated.

The following TABLE 1 is a typical System Table which can be prepared by repeating the foregoing at 10% increments in reduction of air flow capacity.

TABLE 1

| AIR FLOW (C.F.M.) | | |
|---|---|---|
| ACTUAL | % | PRESSURE (ins.W.G.) |
| 61,200 | 100 | 5 |
| 55,080 | 90 | 4.05 |
| 48,960 | 80 | 3.2 |
| 42,840 | 70 | 2.45 |
| 36,720 | 60 | 1.8 |
| 30,600 | 50 | 1.25 |
| 24,480 | 40 | 0.8 |

Figure 9:
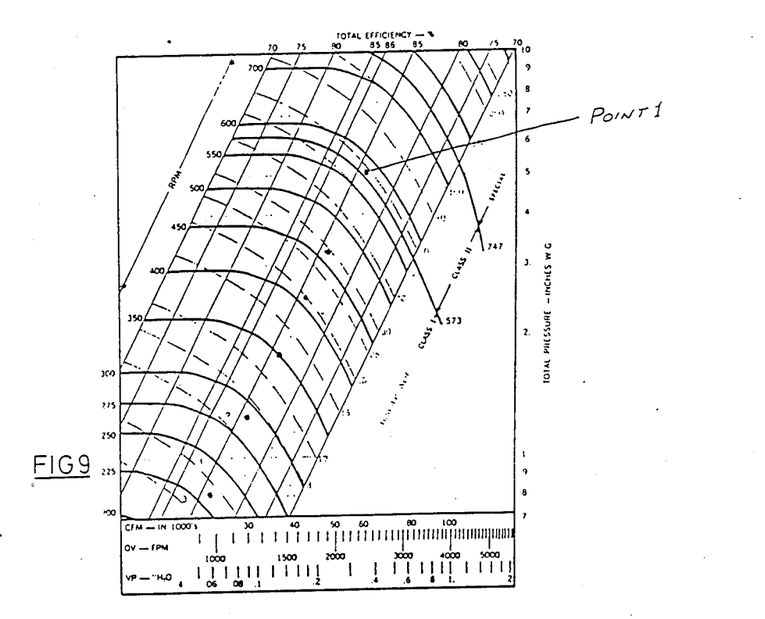
FIG. 9 is a diagram illustrating a typical fan curve of a variable speed fan upon which the plot of the system curve of FIG. 8 is superimposed.

I am now in a position to plot the System Curve A (FIG. 8) on the Fan Curves (FIG. 9) of the selected fan and the point at which the System Curve intersects the speed curves (FIG. 9) is noted and tabulated to provide Table 2 as follows;

TABLE 2

| AIR FLOW (C.F.M.) | | PRESSURE | FAN SPEED |
|---|---|---|---|
| ACTUAL | % | (ins.W.G.) | (rpm) |
| 61,200 | 100 | 5 | 587 |
| 55,080 | 90 | 4.05 | 523 |
| 48,960 | 80 | 3.2 | 462 |
| 42,840 | 70 | 2.45 | 409 |
| 36,720 | 60 | 1.8 | 351 |
| 30,600 | 50 | 1.25 | 289 |
| 24,480 | 40 | 0.8 | 231 |

With this information, I can now obtain a Curve C (FIG. 7) of air flow/fan speed for the condition where the pressure in the duct is not controlled. Thus, I can establish the speed at which the fan should run in order to provide any required percentage of flow capacity when the pressure in the duct system is not controlled.

Figure 7:
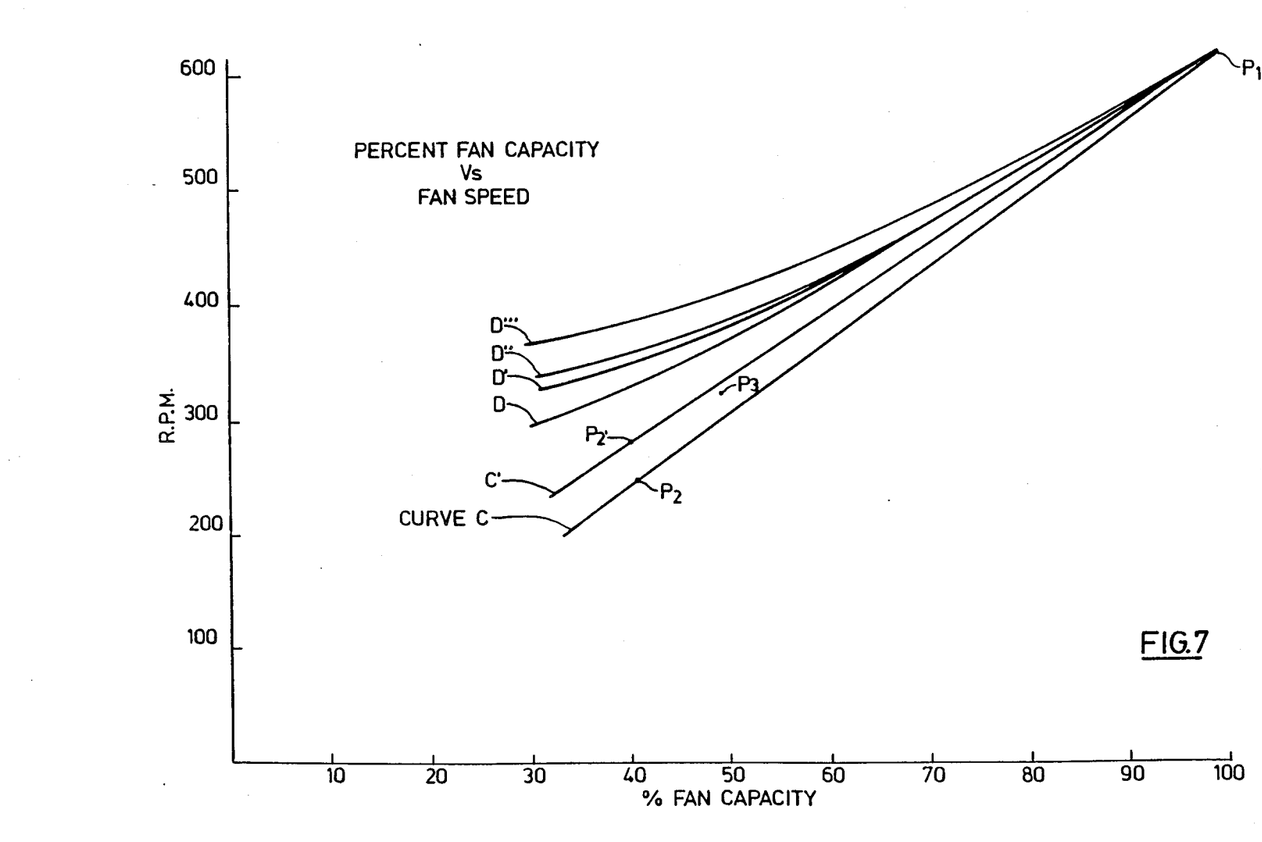
FIG. 7 is a graph showing percentage fan capacity versus fan speed of a typical supply fan.

In practice the fan curves which are provided by the fan manufacturer may not accurately reflect the conditions which prevail in a particular instalation. In these circumstances it is necessary to take readings of the actual air flow in the duct of the system in order to determine Points P1 and P2' to obtain a modified Curve C' (FIG. 7). This is information which is commonly provided by the System Balancing Contractor. These measurements provide the fan speed and air flow at maximum and minimum conditions which can be used to plot Points P1 and P2' of Curve C' of FIG. 7. Thus Curve C' of FIG. 7 is a typical "Actual System Fluid Flow Curve" and Curve C is a "Theoretical System Fluid Flow Curve". The Curve C' and the Curve C may be substantially identical in well designed fluid circulating systems.

I know that the limiting case of the path P1-P2' is a straight line, and further that a further Point 3 cannot be above this straight line (P1-P2'), although it may be below the straight line (P1-P2'). If the third point (Point 3) can be obtained from the Balancing Contractor it would greatly increase the accuracy of path P1-P2'.

The theoretical relationship between the speed of a fan and the pressure rise across a fan and the relationship between the speed of a fan and the air flow of a fan is well known;

$$\text{i.e. } \frac{RPM_1}{RPM_2} = \frac{q_1}{q_2}$$

$$\text{and } \frac{RPM_{12}^2}{RPM_2^2} = \frac{P_1}{P_2}$$

Thus, as a first approximation I can determine the relationship between the air flow output of a fan and its speed (Curve C' FIG. 7) which is the "System Fluid Flow Curve" from which the "System Fluid Flow Data" may be obtained. This relationship does permit me to utilize the speed of the fan to generate a signal which is proportional to air flow. In my control system I provide a curve fitter, which may be in the form of an amplifier or a digital computer or the like which I program with the System Fluid Flow Curves or System Fluid Flow Data which I have previously developed as described above. I am then able to input a signal to the curve fitter which is proportional to the speed of the fan which is processed by the curve fitter to generate an output signal which is proportional to the actual rate of flow in the system.

My system may also be employed in an air or liquid circulating system of a building which has a building automation computer to monitor and control the operations of these systems. This type of computer may be programmed to accept the speed input signal from a fan or pump and to calculate air flow (C.F.M.) or liquid flow (G.P.M.).

The foregoing Example relates to a system in which the pressure in the system is not controlled.

If a fan is attached to an air conditioning system consisting of filters, coils, ducts, terminal boxes, dampers, etc., air flow will take place at the point where the System Curve intercepts the Fan Curve. If the system is a constant volume system, there would be one fan curve depicting the head-flow condition at a particular constant speed. In a Variable volume instalation there are many system curves between the curve depicting minimum flow and the curve depicting maximum flow.

Each time a damper changes position, resulting in a different pressure in the duct, flow would be affected. Since air flow can only take place at the point of intersection of the fan curve and the system curve, if the duct resistance changes the System Curve will change. Hence, there can be many System Curves within the definable limits of maximum and minimum flow.

If the fan is to vary capacity, there would likewise be an infinite number of fan characteristic curves between minimum and maximum capacity; one for each speed. The fan system operation is somewhere in the region defined by the minimum capacity-flow and the maximum capacity-flow condition which is determined by the system demand. That is to say the minimum capacity flow is that which results when the load demand is at a minimum and the maximum capacity-flow results when the load demand is at design conditions.

If the system curve follows EQUATION 1 or the simplified EQUATION 2, then an accurate graph of fan speed versus air flow may be obtained. In variable speed systems, a signal proportional to speed is easily obtained. Since this graph is linear for at least part of its range, it can be used to read out air flow directly within the linear range. The zero flow offset is the value of the measured pressure in the duct. This is easily obtained from the static pressure controller specifically from the pressure sensor output after signal conditioning or from the set point circuit. Therefore, an inexpensive and accurate method of indicating air flow can be obtained.

EXAMPLE 2

In a typical air conditioning application, the ducting system is designed by an engineering contractor. The engineering contractor also specifies the fan to be used in association with the system. The System Balancing Engineer will provide the data which includes the actual pressure and speed of flow at the specified maximum and minimum flow rates. Typically, the designer of a control system may be advised that the fan which is to be used is designed to deliver 61,200 cfm at 5" w.g. and the pressure in the duct system is to be controlled to $1\frac{1}{4}$" w.g. When such a system has been balanced by the Balancing Engineer may typically report that, at the actual minimum flow the fan must deliver 25,000 c.f.m. of air at 2.1" w.g. while rotating at 335 r.p.m.

With this information, I can proceed to design a control system which will have a substantially greater accuracy and stability when utilizing a variable speed fan to control the rate of flow of air.

In this example, where the value of "q" (rate of flow) is high, EQUATION 2 may be used to establish the System Curve.

At the condition where no air flows through the duct, the pressure at the inlet to the duct will equal the control pressure, namely $1\frac{1}{4}$" w.g.;

therefore:
in EQUATION 2, when $dP=1\frac{1}{4}$" and $q=0$, we have;

$$1\frac{1}{4}"=C_1(0)+C_3,$$

therefore: $C_3=1\frac{1}{4}$ (i.e. the setting of the pressure controller)

If we now assume the air flow to be 61,200 cfm, at a pressure (dP) of 5" w.g., we find that Equation 2 provides:

$$C_1 = \frac{5 - 1\frac{1}{4}}{(61,200)^2} = \frac{3.75}{(61,200)^2}$$

Thus, air flow in the typical duct system is in accordance with the Equation 2, which can now be solved for flow rates within the the stable operating conditions of the system such as 100% to 40% in 10% increments.

Using this equation, we can therefore develop System Curve B (FIG. 8) which provides an indication of pressure (dP)/air flow rate (q).

As discussed above, the 100% air flow capacity is predetermined, namely 61,200 cfm at 5" w.g.

Using Equation 2, we can now determine the required pressure drop for various reductions in air flow as for example, 90% to 40% in 10% increments.

At 90% air flow capacity, $q=(0.9 \times 61,200)$ cfm, therefore:

$$dP = \frac{3.75}{(61,200)^2} \times (.9 \times 61,200)^2 + 1\frac{1}{4}$$

$$= 3.75 \times 0.9^2 + 1\frac{1}{4}$$

$$= 4.3$$

The following TBLE 3 can be established by repeating the foregoing at 10% increments in reduction of air flow capacity.

TABLE 3

| AIR FLOW (C.F.M.) | | PRESSURE (ins.W.G.) |
|---|---|---|
| ACTUAL | % | |
| 61,200 | 100 | 5 |
| 55,080 | 90 | 4.3 |
| 48,960 | 80 | 3.65 |
| 42,840 | 70 | 3.09 |
| 36,720 | 60 | 2.60 |
| 30,600 | 50 | 2.2 |
| 24,480 | 40 | 1.85 |

We now know the pressure rise across the fan which is required in order to achieve 40% to 100% air flow capacity at 10%

The manufacturer's fan curves relate the fan speed, air flow and pressure drop of the selected fan. It follows that if we plot the air flow and pressure drop from Table 3 on the Fan Curves of the selected fan, we can obtain a reading of Fan Speed/Air Flow. That is to say if the system curves are superimposed on the Fan Curves, the point of intersection is an indication of the required fan speed.

In a typical example where the fan is a variable speed fan Model 1320 manufactured by Canadian Blower/Canada Pump Limited, which will deliver 61,200 cfm at 5" w.g., the following fan speeds are obtained by plotting the air flow and pressure drop from Table 3 as aforesaid.

TABLE 4

| AIR FLOW (C.F.M.) | | PRESSURE | FAN SPEED |
|---|---|---|---|
| ACTUAL | % | (ins.W.G.) | (rpm) |
| 61,200 | 100 | 5 | 587 |
| 55,080 | 90 | 4.3 | 538 |
| 48,960 | 80 | 3.65 | 490 |
| 42,840 | 70 | 3.09 | 443 |
| 36,720 | 60 | 2.60 | 399 |

TABLE 4-continued

| AIR FLOW (C.F.M.) | | PRESSURE | FAN SPEED |
|---|---|---|---|
| ACTUAL | % | (ins.W.G.) | (rpm) |
| 30,600 | 50 | 2.2 | 358 |
| 24,480 | 40 | 1.85 | 302 |

With this information, we can now obtain a graph (Curve D FIG. 7) of air flow/fan speed as a first approximation for the condition where the pressure in the duct is controlled at 1¼" w.g. Thus, we have established a speed at which the fan should run in order to provide any required percentage of flow capacity when the pressure in the duct system is maintained at 1¼".

If, for example, the system is operating at 60% capacity and is delivering 36,720 cfm at a fan speed of 399 rpm., and it is determined that the flow rate should be reduced to 50%, the controller will reduce the speed of the fan to 358 rpm., which provides a flow rate of 30,600 cfm., without any appreciable change of static pressure in the duct system while the pressure across the fan is reduced from 2.60" w.g. to 2.2" w.g.

It will, however, be understood that the curve D is a curve which is a reflection of a theoretical system. In practice, however, the balancing engineer will advise the actual conditions which prevail at maximum and minimum flow and may also provide particulars of the conditions which prevail at one or more intermediate flow condition.

At the lower flow rate, the curve D may not be sufficiently accurate to provide the level of control that is required. I can improve the accuracy of the system by developing a curve D' in the following manner. The balancing engineer has advised as previously indicated, that at the actual minimum flow the fan must deliver 25,000 cfm at 2.1" wg when rotating at 335 rpm. With this information, I am able to plot point 4 on FIG. 8 and point 4 will be a point on the minimum flow system curve. It follows that point 1 which is an indication of the maximum flow condition and the point 4 lie on the modified system curve applicable to the air conditioning system of this example. In the limiting condition, the modified system curve may be considered to be a straight line such as that identified as the second approximation system curve E. If the conditions which prevail at an intermediate flow configuration, is available from the balancing engineer, a third point 5 may be determined from which a third approximation system curve F may be established. We can now plot the third approximation system curve F on the fan curves of FIG. 9 in order to obtain a further table similar to table 4 from which we can in turn plot a further curve D" on FIG. 7 which provides a more accurate system fluid flow curve.

By programming the dual input curve fitter with the curve D", I can then obtain an output which is an accurate measure of the flow rate in the system for all flow rates.

In many air conditioning systems, it may be necessary to make provision for adjustment of the constant pressure setting. That is to say there may be conditions under which it is necessary to change the constant pressure setting in order to permit the system to operate effectively. If it is necessary to change the constant pressure of the systems previously described so that the duct is controlled at, for example, 1½" wg, we will have to modify the third approximation system curve F by such an amount that at 0 air flow, the fan will develop 1½" wg pressure. We can then plot this modified system curve F on the fan curves and this results in a new system fluid flow curve D''' as shown in FIG. 7. This curve D''' is similar to curve D" except that it is rotated about the point 1. In this manner, the curve fitter can be adjusted to accommodate any change in duct pressure by adjusting the setpoint of the control.

If the characteristics of the duct system remain unaltered, a variation in air flow demand may be achieved merely by reducing the speed of the fan to that required to provide the air flow rate as determined by the various curves of FIG. 7.

In most air conditioning systems, however, the ducting system includes a plurality of adjustable flow restrictors at the outlet into the space which is to be conditioned. These restrictors are thermostatically controlled from within the space which is to be conditioned such that they may be activated to increase or reduce the size of the air flow passage of the outlets from the system thereby to adjust the flow rate of the system. If, for example, the restrictors are activated to reduce the flow rate, this will result in an increase in static pressure in the system. The static pressure sensor will detect this increase and will generate a signal which is indicative of the actual pressure in the system. It is then necessary to reduce the speed of the fan in order to return the pressure in the system to the original 1¼" w.g. pressure.

Figure 1:
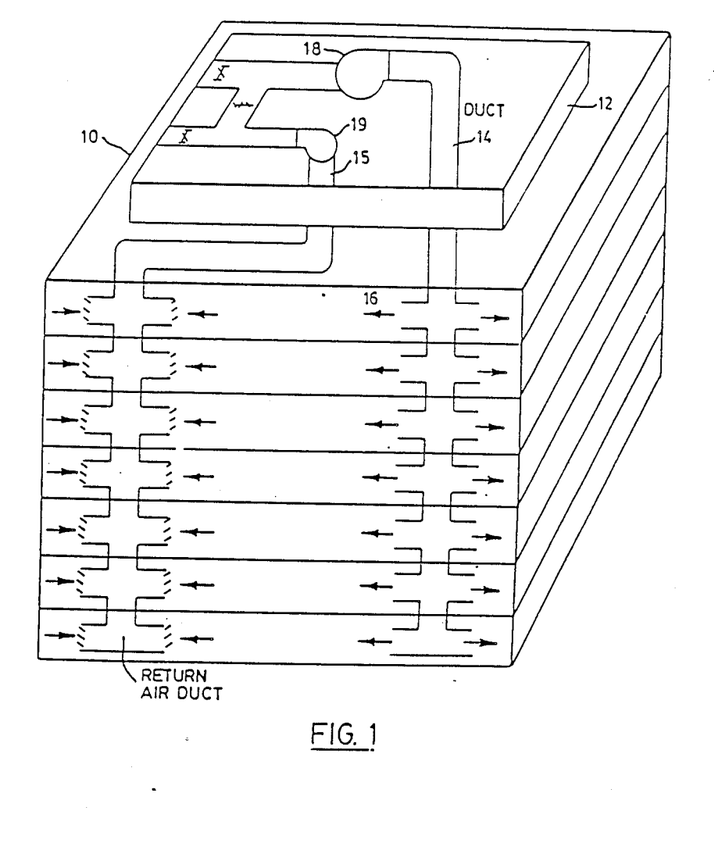
FIG. 1 is a diagrammatic representation of a building having an air conditioning system of the type to which the present invention relates.

With reference to FIG. 1 of the drawings, the reference numeral 10 refers generally to a building in the form of a multi-storey structure which has a fan room 12 from which conditioned air is discharged through a duct 14 from which a plurality of branch ducts 16 extend at various levels through the building.

Figure 2:
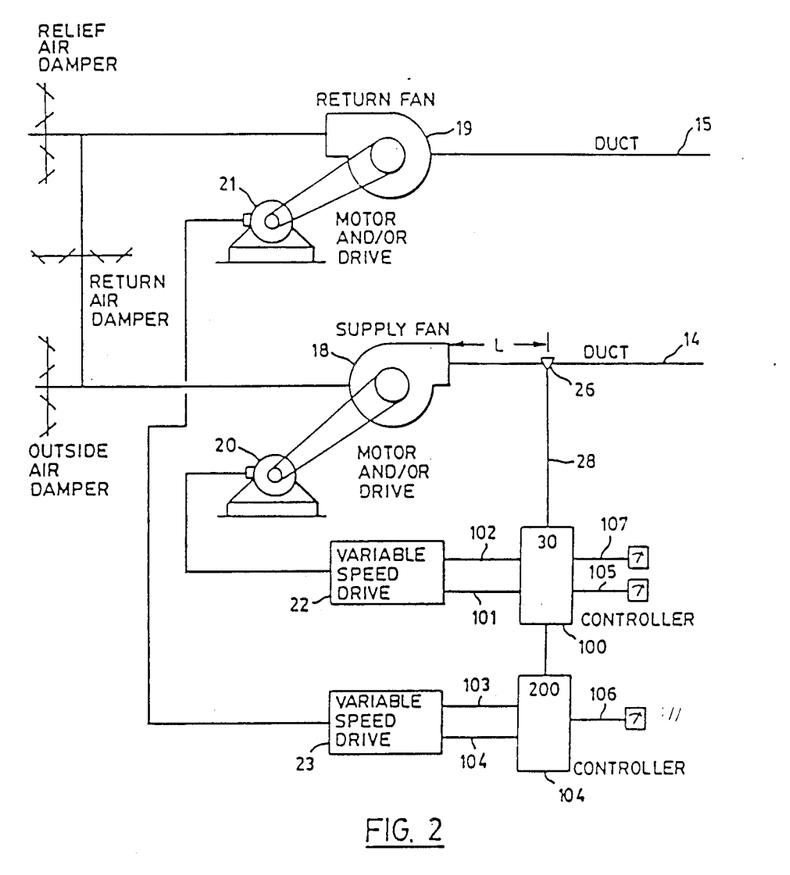
FIG. 2 is a block diagram illustrating a control system suitable for use in association with variable speed fans of an air conditioning system of the type illustrated in FIG. 1.

As shown in FIG. 2 of the drawings, a supply fan 18 is connected to the duct 14. A variable speed motor 20 is connected to the fan 18 and is powered from a suitable power source. A variable speed controller 22 is connected to the motor 20. In addition, a return fan 19 is connected to the return air duct 15. A variable speed motor 21 is connected to the fan 19 and is powered from a suitable power source. A variable speed controller 23 is connected to the motor 21.

A sensing tap 26 is located in the supply duct 14 at a distance L from the discharge end of the supply fan 18 which preferrably less than 5D wherein D is the largest duct diameter downstream of the fan.

The location of the sensing tap 26 is of considerable importance. In order to keep the fan system operation steady, stable and accurate, it is more important to keep the fan from operating in its unstable range than it is to satisfy the duct system requirements for good overall control. I have been able to achieve this objective by locating the static pressure sensing tap 26 as short a distance downstream from the fan as is practical. Ideally, the static pressure sensing probe 26 would be placed at the supply fan discharge flange, however, this is impractical since turbulence is too great at this point leading to erroneous readings. Effectively, the same result may be obtained by locating the static pressure sensing probe 26 within approximately 1 to 5 duct diameters downstream from the fan discharge. It will be noted, however, that the static pressure sensing probe may be located at any position of convenience along the discharge duct upstream of the first branch line 16. The location of the static pressure sensing probe in this manner is contrary to the conventional practice in the air-conditioning industry. This is undoubtedly a carryover from the variable inlet vane control technologies and methods. Conventional thinking is that it is the space which is to be conditioned that must be satisfied and therefore the sensor should be located about ⅔rd's of the way along the longest duct run. While it may be difficult to argue against this reasoning from an intuitive point of view, in practice it is virtually impossible to determine where such a location may be. The duct systems usually run from the fan discharge down one or more shafts in a building with multiple take-offs on each floor with the result that it is difficult, if not impossible, to determine the optimum location for the pressure sensing probe within the building. The main reason for selecting the ⅔ location, however, relates to the control system stability of variable inlet vane control systems and is a compromise between satisfying the longest duct run and the practicality of identifying such a location. It has been generally believed that if the sensing point or tap is sufficiently far away from the fan, the problems associated with the usual inlet vane controls do not show up.

The supply fan controller 30 (FIG. 2) receives a signal from the sensor 26 through a line 28 which may be in the form of a plastic tube or the like which conveys a pneumatic signal to the controller 30. The controller 30 generates an output signal 102 which is directed to the variable speed controller 22 which adjusts the speed of the supply fan motor 20 as required in use.

The supply fan controller 30 will now be described with reference to FIG. 3 of the drawings.

Figure 3:
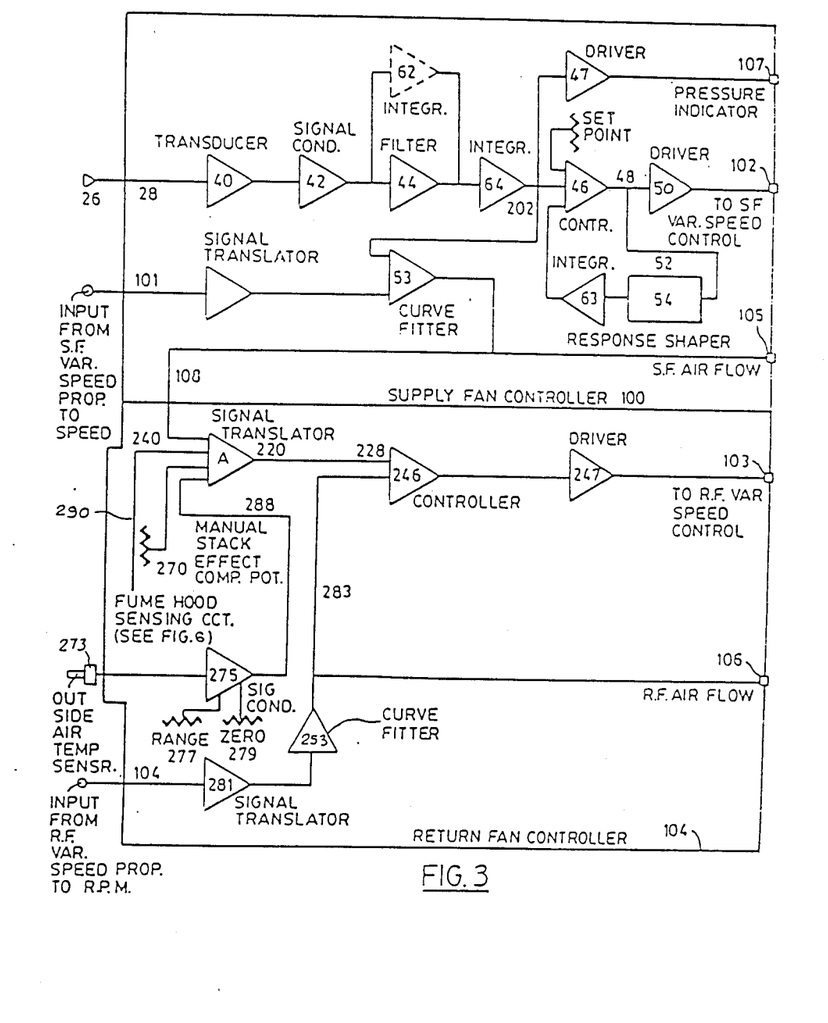
FIG. 3 is a diagram illustrating a variable air volume controller suitable for use in controlling the capacity of the supply fan and controlling the operation of the return fan of an air conditioning system.
Figure 5:
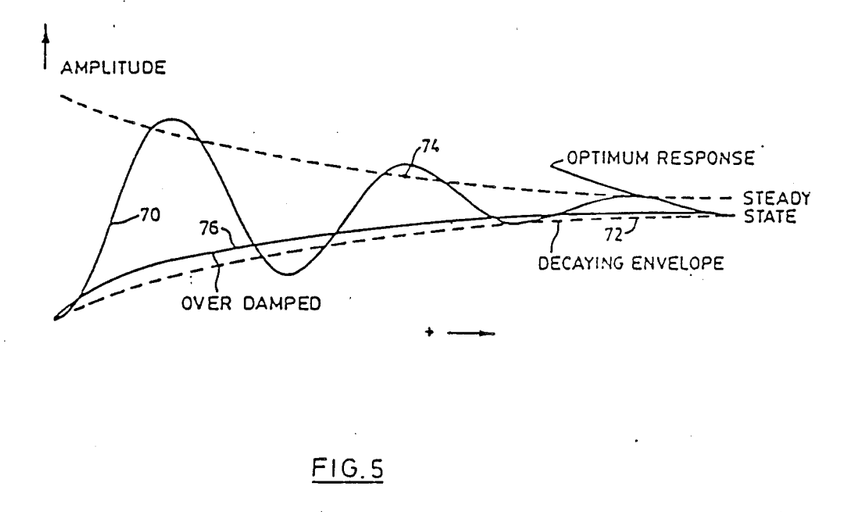
FIG. 5 is a diagram illustrating a response curve of a typical controller system.

As shown in FIG. 3 of the drawings, the line 28 communictes with a transducer 40 which serves to convert the pressure signal to an electrical signal. The electrical signal is fed to a signal conditioner 42 which provides a signal having an output of the order of 0 to 5 volts or 0 to 10 volts. This signal is fed to an adjustable filter 44. The filter 44 is adapted to overdampen the signal which it receives from the conditioner 42 so that its output signal will change progressively to a steady state over an extended time period to ensure that a substantially stable air pressure is maintained in the air duct system 14 in use. This overdamping feature will be described hereinafter with reference to FIG. 5 of the drawings in more detail.

The output signal from the filter 44 is directed to an (optional) integrator 64 and the integrated signal is directed to a driver 47 which in turn produces an output signal which is a direct reading of the pressure in the duct 14. The output signal of the (optional) integrator 64 is also directed to the controller 46 which communicates through line 48 with a driver 50. The driver 50 communicates with the supply fan speed controller 22 through line 102. A set point potentiometer 57 also communicates with the controller 46. The controller 46 is programmed to generate a signal output which is proportional to the required speed of the supply fan. The signal is directed to the driver 50 and then to the supply fan variable speed controller 22 which is in turn connected to the motor 20.

The pressure signal in the line 202 which is derived from the pressure in the supply duct as previously described, is directed to the curve fitter 53. The curve fitter 53 is programmed with the appropriate fan/system curves for the supply fan which is used with the system and acts much in the manner of a look-up table similar to the graph illustrated in FIG. 7, so as to provide an output signal which is directly proportional to the capacity output of the fan. As shown in FIG. 7 of the drawings, this curve may not be linear. I have found that the signal which is proportional to the static pressure can be used to locate the intersection of the fan curves and the Y axis (speed). The curve fitter 53 is a device which receives the speed signal from line 101 and the pressure signal from the filter 44 and is programmed to provide an output signal which is a reading of the supply fan capacity. Thus, it will be seen that the controller 30 provides three outputs, one of which is a pressure indicator, the other of which is a supply fan speed control signal and the other of which is a supply fan air flow output signal. The controller 30 has two inputs which are the pressure signal input from the line 28 and the speed input from the variable speed controller by way of line 101.

A further output signal from the controller is conveyed through line 108 to the controller 104 which is the return fan capacity controller. This signal is the same signal as that which is the indication of the capacity output of the supply fan. This signal is transmitted to a signal translator 220 (FIG. 3) which in turn feeds the controller 246 which drives the driver 247 which provides an output signal in line 103 which is the return fan variable speed control signal.

A manual Building Pressure Compensation Adjustment, to componsate for the "stack effect" or the like, in the form of a potentiometer 270, is provided for the purposes of adjusting the set point of the signal translator 220 to compensate for the stack effect will be described hereinafter. A further outside temperature sensor 273 may be alternately provided which serves to monitor the outside temperature and also serves to provide an offset signal through a signal conditioner 275 which has a range potentiometer 277 and a zero set potentiometer 279. A fume hood sensor circuit which will be described hereinafter with reference to FIG. 7, communicates with the signal translator 220 through sensing line 290.

The controller 104 receives an input speed signal in line 104 from the return fan variable speed controller 23. This signal is received by a signal translator 281 and is processed by a curve fitter 253 which functions in the same manner as the curve fitter 53 of controller 30. The curve fitter 253 does not, however, have an input from the pressure sensor because as shown in FIG. 8 of the drawings, the curves for the return fans are linear and originate at the origin of the X and Y axis. The speed input signal is, however, transmitted to the controller 246 through the line 283. The controller 246 receives the supply fan capacity signal as a set point signal, the return fan capacity signal and is programmed to provide the appropriate return fan variable speed output signal to the variable speed controller 23 along the line 103.

The output signal from the curve fitter 253 is proportional to the return fan air flow output and provides a direct reading thereof by measuring the signal on line 106.

In use, a reduction in pressure in the duct 14 is detected by the sensor 26 which directs a signal to the controller 30 which is activated to direct a signal to the variable speed controller 23 to increase the speed of the motor 20. The controller 30 provides an output signal to the controller 104 which is an indication of the supply fan air flow output and the controller 104 matches this output with the required return fan capacity and generates a signal to the variable speed controller 23 which serves to drive the variable speed return fan at the speed required in order to maintain a balance in the system so that the return fan capacity is effectively matched with the supply fan capacity. Various other parameters are monitored as previously described so that the speed of the return fan motor may be modified depending upon outside air temperature, manual stack effect control and auxiliary air venting systems such as fume hood venting systems. Various modifications of the controller of FIG. 3 will be apparent to those skilled in the art. For example, an integrator 62 may be used in place of the filter 44 or an integrator 64 may be used in addition to the filter 44. If the integrator 64 is used in addition to the filter 44, it is arranged in series with the filter 44 and may be located before or after the filter 44. The integrator 62 or 64 may serve the same function as the filter for periodic disturbances, that is to say the integrator 62 and 64 may serve to integrate out periodic fluctuations in the signal prior to transmission of the signal to the controller.

As previously indicated, the input signal to the return fan capacity controller 104 is the signal conveyed by the line 108 from the controller 30. It will be understood that the return fan characteristics are considerably different to those of the supply fan with the result that before passing the signal in the line 108 to the controller 246, it is necessary to transpose or condition this signal be means of a conditioner 220 so that it varies in accordance with the output curve of the return fan rather than the output curve of the supply fan. This signal is transmitted through the line 228 to provide the set point signal of the controller 246. The controller 246 and driver 247 operate in the same manner as the corresponding components of controller 30. Thus, it will be seen that the output signal of the controller 104 which is directed to the variable speed contrc'ller 23 through line 103 serves to control the operation of the return fan in a manner to insure that the capacity of the return fan closely matches the capacity of the supply fan.

OFFSET TRACKING OF THE RETURN FAN

In order to overcome the difficulties associated with the building pressure or "stack effect" previously described, I provide a manual Building Pressure Compensator potentiometer (SEC) 270. This signal is conditioned by a signal conditioning or translating device 220 and is then fed to the controller 246 through the line 228. The signal generated by the Building Pressure Compensator is received by the controller 246 and serves to offset the tracking of the return fan by an amount equal to approximately half the rotation of the potentiometer. A 50% rotation of the potentiometer would track the return fan as if the Building Pressue Compensator was not in the circuit. Rotating it to one extreme would decrease the return fan tracking and rotating it to the other extreme would increase the return fan tracking. The former will result in the return of less air than would be delivered by the supply fan resulting in more air being available to pressurize the building, in winter, to compensate for the higher outside air pressure. This would eliminate the door operating problem and whistling around the building shafts. Rotating it to the other extreme would increase the amount of air being returned. This would reduce the problem of air exfiltrating from the building and would eliminate the door operating and whistling problems in the summer.

The Building Pressure "stack effect" problem is caused by a temperature difference between the constant building temperature and the variable outside air temperature. This problem is overcome by providing an automatic Building Pressure Compensator. This device is illustrated in FIG. 3 of the drawings and includes an outside air temperature sensor 273 which provides a signal which is conditioned by a signal conditioner 275 which has a range adjustment potentiometer 277 and a zero set potentiometer 279. The output signal from the signal conditioner 275 may be fed to the translator 220 through line 288 in the same manner as the signal of the manual potentiometer. This signal has the ability to automatically adjust the tracking range of the return fan to minimize space pressure fluctuations in the same manner as the manual potentiometer (SEC).

Figure 6:
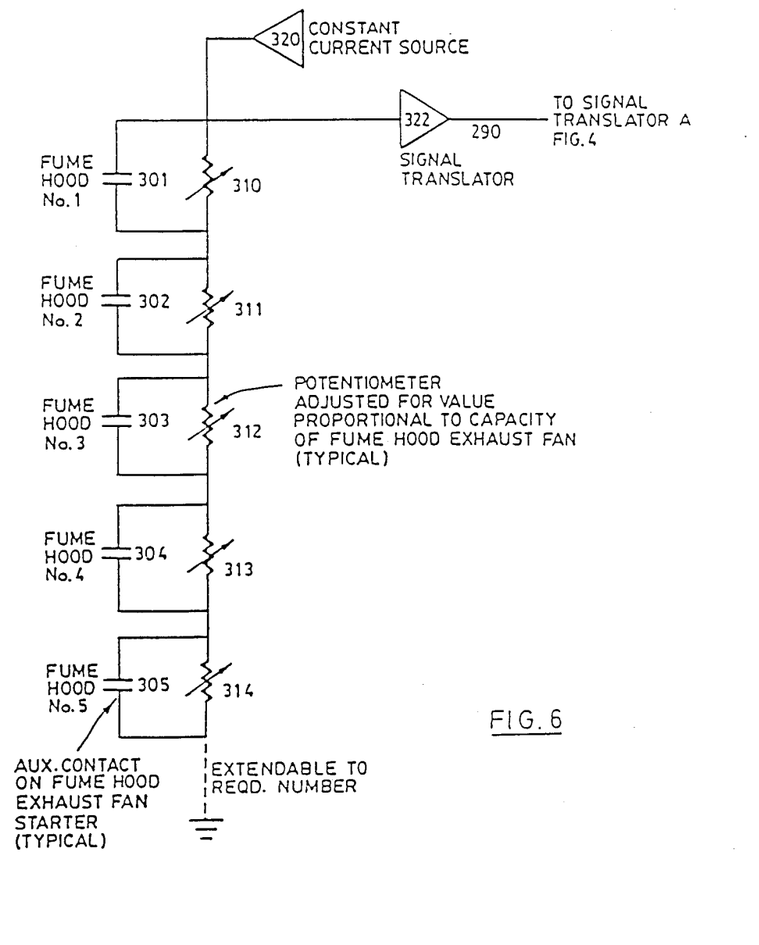
FIG. 6 is a diagram of a system for generating an offset signal to the controller when air exhaust systems are provided in the air space which is to be conditioned.

A further signal may be used for the purpose of offsetting the controller 246. This signal is supplied through line 290. This signal can be used to compensate for air which is exhausted from the air conditioned space such as by way of the fume hood exhaust fans which are widely used in laboratories. A typical fume hood control system is illustrated in FIG. 6 of the drawings wherein an auxiliary contact 301, 302, 303, 304, and 305 is provided and a line pair which communicates with each fume hood exhaust fan motor starter. Potentiometers 310, 311, 312, 313, and 314 are provided, one associated with each fume hood motor starter. The potentiometers 310 to 314 are wired in series and fed from a constant current source 320. The potentiometer values are adjusted to be analogous to the air exhausted by the fan with the result that when the fan is started by the occupant, the auxiliary contacts associated with the fan short out that resistance and a voltage change proportional to the air exhausted by that fan is obtained. The signal translator 322 translates this signal to a signal which can be fed through line 290 to the signal translator 220. It will be apparerent that by this system, it is possible to keep the total air exhausted plus the returned air about the same as the air supplied by the supply fan. There may be a slight offset either negative or positive depending on whether it is desirable to keep the space negative or positive with respect to the outside. This system is particularly well suited to solve the serious air control problems which plague variable volume laboratory air conditioning systems. It will be understood that this system is not restricted to fume hood exhaust systems but is applicable to any system in which conditioned air is discharged from the space by way of a separate exhaust system.

OVER-DAMPING OF CONTROL SIGNAL

According to general control theory, the optimum control system is one that is optimally dampened, i.e. a system wherein the output amplitude cycling falls within a decaying envelope within approximately 3 excursions. In this regard, reference is made to FIG. 5 of the drawings which illustrates optimal damping of the amplitude of the conventional control signal illustrated by the line 70. The signal 70 is normally dampened within the decay envelope illustrated by the lines 72 and 74 within approximately 3 excursions.

In air-conditioning systems, any changes that take place in the system loading are mainly due to the sun shining in windows, due to people moving into and out of the space to be conditioned or due to lights and heat producing equipment such as computer terminals or the like being turned on or off. If, for example, a computer is running and producing heat, when it is turned off, it functions as a heating element. The residual heat reduces very slowly. In addition, there is the thermal mass of the building structure that dampens all air-conditioning load changes. By the time the terminal air conditioning boxes collectively react to these load changes, and they should collectively react slowly, sometimes minutes will pass. Frequently the load changes in one part of a system are cancelled by load changes in another part of the system which are nearly identical in magnitude but opposite in direction. For example, the load resulting from the movement of direct sunlight around a building in the course of a day can result in changes in the load applied to various parts of a building while the total load may remain substantially the same over the full day.

Conventionally, control system response times are measured in very small fractions of a second, frequently in milli or micro seconds. However, air-conditioning load changes take place in much longer time periods as for example, periods as long as several minutes or more. When these changes take place, the control system must be sensitive enough to sense them and to react accordingly. I have recognized these characteristics and for this reason I provide a control system in which the control signal is over-dampened, thereby to increase the controller sensitivity. Over-damping is achieved by the filter 44 previously described so as to generate a signal to the controller 46 which follows a curve like curve 76 illustrated in FIG. 5 of the drawings.

The slow system response which I am able to generate is important for other reasons. Terminal boxes connected to the duct system, are usually under the control of a room thermostat. Such a thermostat will allow a typical box to pass just the correct amount of air to the space to satisfy the load. The correct amount of air depends on the pressure upstream of the box remaining constant. If the fan capacity control system which tries to keep this pressure constant is "live" and allowed to cycle, causing the duct pressure to vary, the box will allow more or less air than desirable to pass to the space causing temperature fluctuations. These fluctuations would be sensed by the thermostat which would try to correct them. The net result of this scenario is that the two control systems fight each other and the whole air-conditioning system would become unstable. The over-damping of the fan capacity controls helps to prevent this from occurring and greatly assists in providing stable controls.

As previously indicated in FIG. 2 of the drawings, the sensed variable which is detected by the detector 26 is the fan pressure. Generally, this pressure is not steady enough for control purposes and the filter 44 which has a long time constant serves to filter out transients and to allow only actual load changes heavily filtered to pass to the controller 46. The time constant is adjustable with the adjustment providing a range of 0 to 200 seconds. The time constant may therefore be adjusted on-site to be a good compromise between the desired system response time and control system stability.

As previously indicated, integrators 62 or 64 may be substituted for or used in conjunction with the filter 44. In control systems requiring fast response times, cycling occurs at a specific frequency. If the control system is set for the desired sensitivity and impermissable and excessive cycling occurs, substituting an integrator for a filter may help to overcome this difficulty. The integrator must be inserted into the circuit as illustrated in FIG. 3 of the drawings between the signal conditioner 42 and the controller 46. As the transmitter senses the system cycling, the integrator will act on the output. As long as the cycling is of a set frequency, the integrator will integrate out the fluctuations. The integral of a symetrical periodic function is zero. Therefore, the integrator output will consist of the steady state value only as sensed by the transmitter. It is important that the frequency of the cycling be measured on the job site and adjusted into the integrator. An alternate position of the integrator is in the feedback loop. This device may be used with or without filter 44 and integrators 62 and 64.

Controller 30 may also be constructed with a microprocessor replacing some or all signal processing, conditioning, filtering, integrating, controlling, feedback, set point and detecting functions by means of software algorithms contained in the micro-processor's memory.

In air delivery systems having well designed air entry and exit configurations for the fan, the accuracy of my method and control system is derived from the accuracy of the fan curves which are provided by the manufacturers of the various fans. The manufacturers take great pains to assure the accuracy of their fan curves. It will be apparent that the manufacturer's fan curves may have to be modified for a particular installation if the inlet and outlet configuration of the fan are significantly different from those utilized by the fan manufacturer in preparing the ideal fan curves.

While some inaccuracy will inevitably be present in my system this will primarily result from loading of the air or fluid filters which are employed in my system. However, if the pressure drop across the filters due to clogging increases by 1 inch W.G. in a fan system selected for 4 inches W.G., the error only increase by 3%. Consequently the accuracy of my system is improved by a significant factor. Furthermore, because all signalling processes are done electronically, drifting is essentially eliminated and recalibration is essentially no longer required.

Various modifications of the present invention will be apparent to those skilled in the art. It will be apparent that the air conditioning control system of the present invention may be used to advantage in a single storey building in which case it serves to overcome the difficulties experienced with lateral rather than vertical air disturbances.

I claim:

1. In a fluid flow system which includes a conduit for conveying the fluid from a fluid delivery device which provides a variable volume fluid discharge by varying the speed of operation of the fluid delivery device, and wherein it is necessary to generate a rate of flow signal which is proportional to the volume of fluid delivered by the fluid delivery device in use, the improved method of generating said rate of flow signal comprising the steps of;
   (i) generating a first input signal which is proportional to the speed of the fluid delivery device,
   (ii) inputting the first input signal to a curve fitter which programmed with the combined fluid delivery device/conduit system characteristic curve according to the formula;

$$C_1 q^2 - KS^2 = 0$$

where;
$C_1$ is a constant (turbulent flow coefficient)
q is the rate of flow in the system,
K is constant $=P_2/S_2^2$
   where;
   $P_2$ is the maximum pressure generated by the fluid delivery device when it operates at design conditions, S is the speed of the fluid delivery device, $S_2$ is the speed of the fluid delivery device when operating at maximum design conditions and to thereby generate said rate of flow signal, as an output signal from said curve fitter, which is proportional to fluid flow delivered by the fluid delivery device.

2. The method of claim 1 wherein said fluid delivery device is a variable speed fan.

3. In a fluid flow system which includes a conduit for conveying the fluid from a fluid delivery device which provides a variable volume fluid discharge by varying the speed of operation of the fluid delivery device, and wherein it is necessary to generate a rate of flow signal which is proportional to the volume of fluid delivered by the fluid delivery device in use, the improved method of generating said rate of flow signal comprising the steps of;

(i) generating a first input signal which is proportional to the speed of the fluid delivery device, (ii) generating a second signal which is proportional to the pressure in the conduit at zero flow, and (iii) inputting said first and second input signals to the first and second inputs respectively of a dual input curve fitter which is programmed with the combined fluid delivery device/conduit system characteristic curve according to the formula;

$$C_1 q^2 + C_3 q^0 - KS^2 = 0$$

where;

$C_1$ is a constant (turbulent flow coefficient)

$C_3$ is a constant which is independent of flow and is equal to the pressure generated by the fluid device at zero flow.

q is the rate of flow in the system,

K is a constant $= P_2/S_2^2$ where;

$P_2$ is the maximum pressure generated by the fluid delivery device when it operates at design conditions, S is the speed of the fluid delivery device, $S_2$ is the speed of the fluid delivery device when operating at maximum design design conditions and to thereby generate said rate of flow signal, as an output signal from said curve fitter, which is proportional to fluid flow delivered by the fluid delivery device.

4. The method of claim 3 wherein said fluid delivery device is a variable speed fan.

5. In a fluid flow system which includes a conduit for conveying the fluid from a fluid delivery device which provides a variable fluid discharge by varying the speed of operation of the fluid delivery device, and wherein it is necessary to generate a rate of flow signal which is proportional to the volume of fluid delivered by the fluid delivery device in use, the improved method of generating said rate of flow signal comprising the steps of;

(i) generating a first input signal which is proportional to the speed of the fluid delivery device, (ii) generating a second signal which is proportional to the pressure in the conduit at zero flow, and (iii) inputting said first and second input signals to the first and second inputs respectively of a dual input curve fitter which is programmed with the combined fluid delivery device/conduit system characteristic curve according to the formula;

$$C_1 q^2 + C_2 q^1 + C_3 q^0 - KS^2 = 0$$

where;

$C_1$ is a constant (turbulent flow coefficient)

$C_2$ is a constant (laminar flow coefficient)

$C_3$ is a constant which is independent of flow and is equal to the pressure generated by the fluid device at zero flow.

q is the rate in the system,

K is a constant $= P_2/S_2^2$ where;

$P_2$ is the maximum pressure generated by the fluid delivery device when it operates at design conditions, S is speed of the fluid delivery device, $S_2$ is the speed of the fluid delivery device when operating at maximum design conditions and to thereby generate said rate of flow signal, as an output signal from said curve fitter, which is proportional to fluid flow delivered by the fluid delivery device.

6. The method of claim 5 wherein said fluid delivery device is a variable speed fan.

* * * * *